United States Patent
Lee et al.

[11] Patent Number: 5,999,274
[45] Date of Patent: Dec. 7, 1999

[54] APPARATUS AND METHOD FOR TRANSMITTING FACSIMILE DATA

[75] Inventors: Warren S. Lee; David W. Copp; William D. Meadow, all of Jacksonville, Fla.

[73] Assignee: NKO, Inc., Jacksonville, Fla.

[21] Appl. No.: 08/649,237

[22] Filed: May 17, 1996

[51] Int. Cl.⁶ .............................................. H04M 11/00
[52] U.S. Cl. ............................................ 358/434; 358/400
[58] Field of Search ........................... 358/400, 402–403, 358/407, 434, 440, 442, 468; 379/100.01, 100.12, 100.17

[56] References Cited

U.S. PATENT DOCUMENTS

| | | | |
|---|---|---|---|
| 4,058,838 | 11/1977 | Crager et al. | 358/257 |
| 4,741,021 | 4/1988 | Kotani et al. | 379/100 |
| 4,746,986 | 5/1988 | Tanigawa | 358/256 |
| 4,905,273 | 2/1990 | Gordon et al. | 379/93 |
| 4,961,185 | 10/1990 | Sawada | 370/79 |
| 4,964,154 | 10/1990 | Shimotono | 379/100 |
| 4,964,159 | 10/1990 | Son | 379/356 |
| 4,974,097 | 11/1990 | Kaneko et al. | 358/400 |
| 4,999,836 | 3/1991 | Fujiwara | 370/110.1 |
| 5,033,078 | 7/1991 | Andoh | 379/100 |
| 5,034,948 | 7/1991 | Mizutani et al. | 370/79 |
| 5,050,005 | 9/1991 | Kagami | 357/434 |
| 5,065,427 | 11/1991 | Godbole | 379/100 |
| 5,113,396 | 5/1992 | Kagami | 378/110.2 |
| 5,134,611 | 7/1992 | Steinka et al. | 370/79 |
| 5,134,653 | 7/1992 | Satomi et al. | 379/355 |
| 5,142,568 | 8/1992 | Ogata et al. | 379/100 |
| 5,170,428 | 12/1992 | Watanabe et al. | 379/94 |
| 5,187,591 | 2/1993 | Guy et al. | 358/425 |
| 5,189,525 | 2/1993 | Kotani | 358/407 |
| 5,189,696 | 2/1993 | Yoshida | 379/355 |
| 5,204,895 | 4/1993 | Yoshiura | 379/100 |
| 5,216,517 | 6/1993 | Kinoshita et al. | 358/400 |
| 5,216,519 | 6/1993 | Daggett et al. | 358/434 |
| 5,216,705 | 6/1993 | Yoshida et al. | 379/100 |
| 5,228,128 | 7/1993 | Kim | 395/275 |
| 5,235,595 | 8/1993 | O'Dowd | 370/94.1 |
| 5,241,589 | 8/1993 | Jefferson | 379/355 |
| 5,260,991 | 11/1993 | Ikegaya | 379/100 |

(List continued on next page.)

OTHER PUBLICATIONS

CCITT X.5: Data Communication Networks: Services and Facilities, Interfaces—Facsimile Packet Assembly/Disassembly Facility (FPAD) in a Public Data Network, Geneva, 1992.

CCITT X.39: Data Communication Networks: Services and Facilities, Interfaces—Procedures for the Exchange of Control Information and User Data Between a Facsimile Packet Assembly/Disassembly (FPAD) Facility and a packet Mode Data Terminal Equipment (DTE) or Another FPAD, Geneva 1992.

ITU–T X.29: Public Data Networks: Interfaces—Procedures for the Exchange of Control Information and User Data Between a Packet Assembly/Disassembly (PAD) Facility and a Packet Mode DTE or Another Pad, Mar. 1993.

*Primary Examiner*—Thomas D Lee
*Assistant Examiner*—Stephen Brinich
*Attorney, Agent, or Firm*—Foley & Lardner

[57] ABSTRACT

A system for transmitting data in real-time over a standard digital data network, or an analog network, whereby the facsimile data is sent in data packets on the digital data network. A number in an area being dialed by a facsimile device is monitored to determine whether the number is either a local number, inter-lata number, intra-lata number or a long distance number and whether the area is being serviced by the digital data network. Based on the determination, a first POP (point-of-presence) receives the facsimile transmission, converts the facsimile transmission to a rasterized form, and then converts the rasterized data into "packets" of data, which are sent over the digital data network, one packet at a time, to a second POP. The second POP receives the packets over the digital data network, converts the packets to the rasterized form, and then reconverts the rasterized data using the G3 protocol, to be sent over the analog telephone network to the destination facsimile.

17 Claims, 9 Drawing Sheets

5,999,274
Page 2

U.S. PATENT DOCUMENTS

| | | | |
|---|---|---|---|
| 5,267,307 | 11/1993 | Izumi et al. | 379/354 |
| 5,272,749 | 12/1993 | Masek | 379/216 |
| 5,278,665 | 1/1994 | Sawada et al. | 358/442 |
| 5,280,516 | 1/1994 | Jang | 379/57 |
| 5,282,202 | 1/1994 | Bernstein et al. | 370/94.1 |
| 5,282,238 | 1/1994 | Berland | 379/58 |
| 5,287,202 | 2/1994 | Kumarappan | 358/440 |
| 5,289,533 | 2/1994 | Waslo et al. | 379/100 |
| 5,289,536 | 2/1994 | Hokari | 379/221 |
| 5,291,302 | 3/1994 | Gordon et al. | 358/400 |
| 5,295,244 | 3/1994 | Dev et al. | 395/161 |
| 5,299,257 | 3/1994 | Fuller et al. | 379/100 |
| 5,305,372 | 4/1994 | Tomiyori | 379/59 |
| 5,315,649 | 5/1994 | Foster et al. | 379/355 |
| 5,323,398 | 6/1994 | Wake et al. | 370/110 |
| 5,329,580 | 7/1994 | Yoshino | 379/90 |
| 5,337,349 | 8/1994 | Furohashi et al. | 379/100 |
| 5,339,174 | 8/1994 | Harris | 358/442 |
| 5,347,516 | 9/1994 | Yoshida | 370/94.1 |
| 5,381,240 | 1/1995 | Murayama | 358/436 |
| 5,410,416 | 4/1995 | Amberg et al. | 358/405 |
| 5,426,692 | 6/1995 | Fujise | 379/93 |
| 5,444,707 | 8/1995 | Cerna et al. | 370/94.1 |
| 5,490,199 | 2/1996 | Fuller et al. | 379/1 | ary
APPARATUS AND METHOD FOR TRANSMITTING FACSIMILE DATA

RELATED APPLICATIONS

This application is related to the following applications:
(a) "Method of Routing a data transmission", Ser. No. 08/649,208, now U.S. Pat. No. 5,815,669;
(b) "Point-of-Presence (POP) for digital facsimile network", Ser. No. 08/649,571, now U.S. Pat. No. 5,739,919;
(c) "Point-of-Presence (POP) for digital facsimile network with Virtual POPs used to communicate with other networks", Ser. No. 08/649,572;
(d) "Point-of-Presence (POP) for digital facsimile network with Spoofing capability to maintain fax session", Ser. No. 08/649,239, now U.S. Pat. No. 5,828,468;
(e) "Method of monitoring a data transmission", Ser. No 08/649,202; and
(f) "Facsimile Jack for selectively Routing a transmission through a facsimile network", Ser. No. 08/649,209, all of which are filed concurrently with this application.

BACKGROUND OF THE INVENTION

1. Field of the Invention

The present invention generally relates to an apparatus and method for transmitting facsimile data and, more particularly, to a facsimile system for transmitting data in real-time over a standard digital data network, or an analog network, whereby the facsimile data is sent in data packets on the digital data network.

2. Discussion of Related Art

In a known facsimile transmission, as shown in FIG. 1(a), a facsimile (fax) machine 10 dials a destination phone number and the call is routed through a central office Local Exchange Carrier LEC CO 14. A connection is made from the LEC Co 14 to an inter-exchange carrier's Point of Presence, IXC POP 16. IXC POP 16 makes a connection through a long distance carrier facility 15, to a destination IXC POP 17, which in turn makes a connection to a destination LEC CO 18. The destination LEC CO 16 then calls the phone number of the destination facsimile machine 11. Once the destination facsimile machine 11 answers, an end-to-end connection is established between the two facsimile machines 10, 11. The appropriate facsimile session setup is then performed by the two facsimile machines 10, 11, and this is followed by the facsimile data transmission. Upon completion of the facsimile transmission, the facsimile machines hang-up and the connection is terminated.

In the known system of FIG. 1(a), when one facsimile machine dials another, a circuit-like connection is created between the two machines. There is very little delay from when the source facsimile machine 10 sends data to when the destination facsimile 11 machine receives the data.

Further in the known system, the telecommunications services (phone lines, etc.) used for typical facsimile transmissions, and their associated cost structure, are formally defined by the carrier in a document called a tariff. Tariffs are filed for approval by state regulatory commissions and/or the Federal Communication Commission (FCC).

Other known systems use store and forward services for facsimile transmission. With store and forward, a facsimile is generally transmitted to a local vendor with information about the final destination. The local vendor then takes responsibility for delivering the facsimile. Such services are not in real-time in that there is no circuit-like connection between the source and destination facsimile machines. In such systems, the facsimile transmission is usually sent at a later time when the rates are less. A disadvantage to this technique is that in the event a facsimile cannot be delivered to the destination facsimile machine, there may be no reliable way of notifying the user of the source facsimile machine that the facsimile has not been delivered. Important facsimiles requiring immediate delivery and confirmation of receipt generally cannot be sent through such systems.

Another conventional way of reducing costs of data transmission including, for example, voice data, is to use alternate communication services, such as dedicated telephone lines such as a Wide Area Telephone Service (WATS) line. Alternatively, telephone companies offer a variety of overlapping discount schedules which could be utilized to minimize costs for a particular transmission. A disadvantage of using such alternate communication services is that a user has to be aware of a multitude of telephone number, access codes, and rate schedules.

Facsimile transmissions today are accomplished through the use of analog grade circuits, also known as POTS (Plain Old Telephone Service). Facsimile transmissions are inherently digital and need to be converted to analog only for compatibility with the existing access methods (i.e. voice grade lines). The bandwidth of analog voice grade circuits is very small and so the telephone companies have migrated most if not all of their equipment to provide transmission services using a digital network. The conversion of analog voice into digital form used in the digital networks involves a fairly high data rate of 64 Kbps, however, facsimile data is transmitted at a much lower data rate of, typically, 9.6 Kbps or 14.4 Kbps. A disadvantage of such systems is that when facsimiles are transmitted over a voice grade circuit through the network's digital transmission facilities, most of the bandwidth of the digital network is not utilized even though it is being paid for.

An example of the above-described digital network is shown in FIG. 1(b), and corresponds to a system recommended in a document published by the ITU. In the ITU system, data is transmitted digitally between a source facsimile packet assembly/disassembly facility (FPAD) 4 and a destination FPAD 6 through a Packet Switched Public Data Network (PSPDN) 5. The access to either FPAD 4 or 6 is still made through its respective General Switched Telephone Network (GSTN) 3 or 7. The ITU system has some technical characteristics; however, which make it unattractive, particularly for facsimile transmissions. They are:

1. It runs on X.25 protocol which significantly increases the length of call.
2. It does not guarantee delivery of data.
3. It has a variable delay in delivery of communicated packets.
4. It does not accommodate switched analog access lines.

SUMMARY OF THE INVENTION

An object of the invention is to provide a low-cost transmission of facsimile data.

Another object is to provide a facsimile network in a real-time manner.

Still another object is to provide a system for routing facsimile transmissions over a digital network in which a customer does not have to do anything different from what the customer currently does to send facsimile transmissions.

Accordingly, the present invention relates to an apparatus and method for transmitting data in real-time over a standard digital data network, or an analog network, whereby the facsimile data is sent in data packets on the digital data network. An access device (FaxJack) connected between the facsimile machine and a phone jack monitors a number in an area being dialed by a facsimile device, and determines whether the number is in an area being serviced by the digital data network. If the number cannot be accessed by a first SmartPOP (point of presence), then the facsimile transmission is sent over the analog network using a standard G3 protocol, and if the destination facsimile number can be accessed by the first SmartPOP, then the FaxJack sends the facsimile data to the first SmartPOP which is accessed via a local telephone call over a standard telephone line. The first SmartPOP receives the facsimile transmission, converts the facsimile transmission to a rasterized form, and then converts the rasterized data into "packets" of data, which are sent over the digital data network, one packet at a time, to a second SmartPOP. The second SmartPOP receives the packets addressed to the second SmartPOP over the digital data network, converts the packets to the rasterized form, and then reconverts the rasterized data using the G3 protocol, to be sent over the analog telephone network to the destination facsimile.

Additional objects, advantages and novel features of the invention will be set forth in the description which follows, and in part will become apparent to those skilled in the art upon examination of the following or may be learned by practice of the invention.

BRIEF DESCRIPTION OF THE DRAWINGS

FIG. 1(*b*) is a schematic illustration of a digital facsimile transmission system;

FIG. 5(*b*) is a block diagram showing the connectivity of the components of the network operations according to the invention;

DETAILED DESCRIPTION OF THE PREFERRED EMBODIMENTS

Figure 1A:
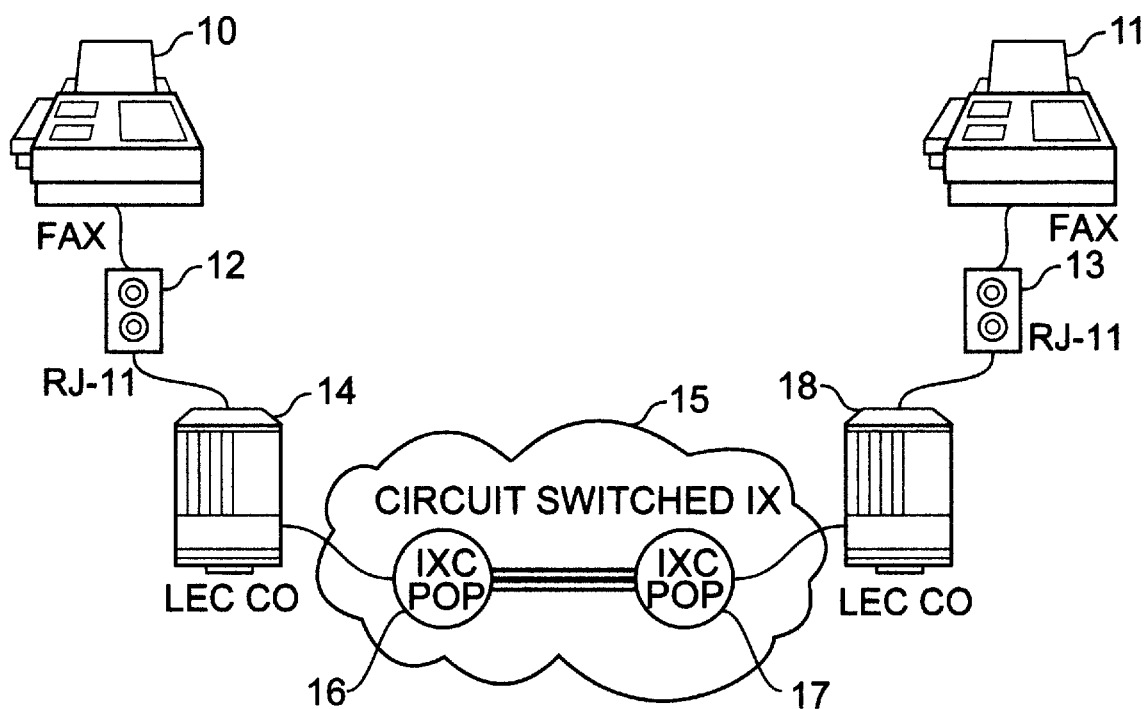
FIG. 1(*a*) shows a schematic illustration of a conventional facsimile transmission system.
Figure 1B:
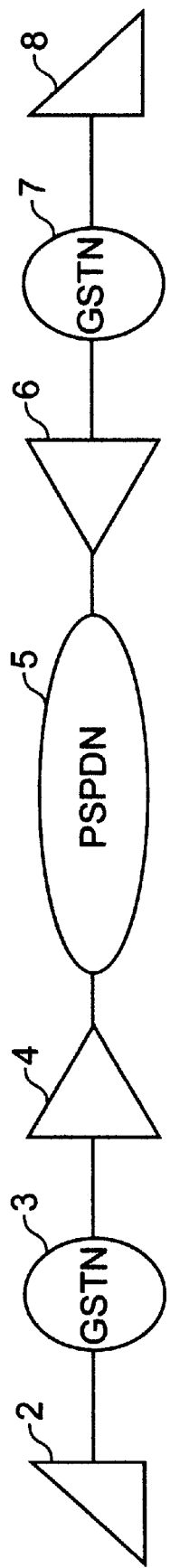
Figure 2:
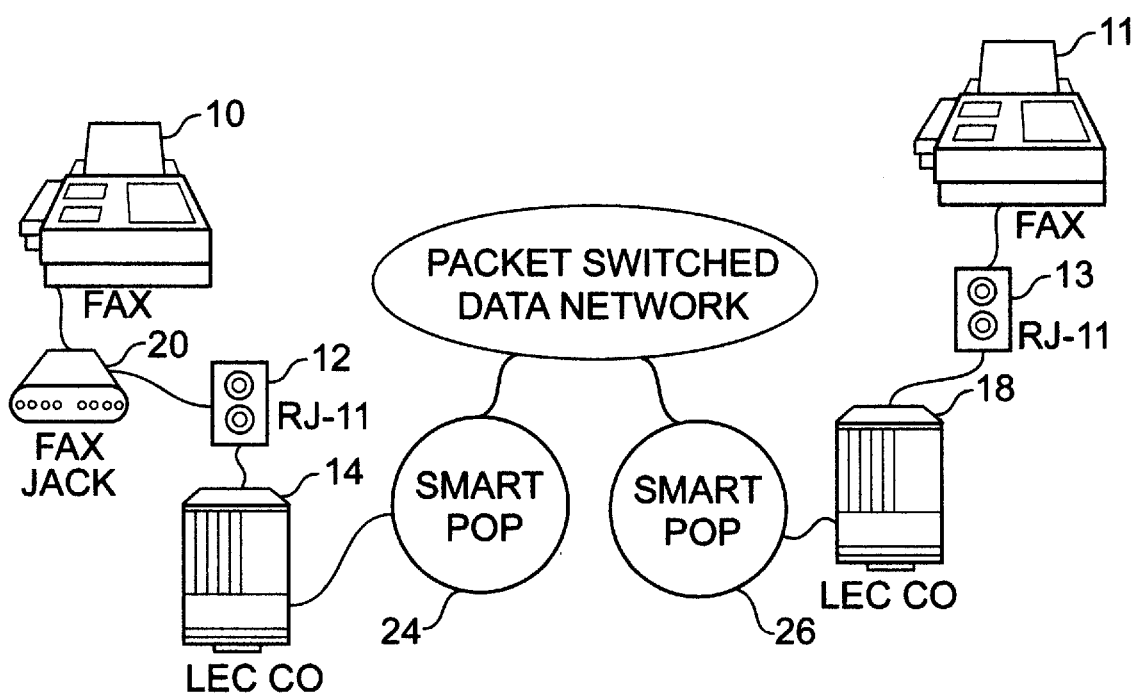
FIG. 2 shows a schematic illustration of a digital facsimile transmission system according to the invention.

A preferred embodiment of the apparatus and method for transmitting facsimile data is illustrated in FIG. 2. Referring to FIG. 2, first, a user at the source facsimile machine 10 places documents to be sent into the source facsimile machine 10 and keys in the phone number of the destination facsimile machine 11. The facsimile machine 10 then issues an off hook signal to gain control of the phone line. The FaxJack 20 detects the request for off hook, takes the phone off-hook, and connects the receive channel of the phone line with the facsimile machine 10. The facsimile machine 10 detects the dial tone and initiates dialing. Instead of the digits being dialed directly to the LEC CO 14, they are intercepted by the FaxJack 20. The FaxJack 20 then determines if the number being dialed can be serviced by the network. If it cannot, it dials the original number and connects the transmitting channel of the facsimile machine 10 to the phone line. If the number is serviced by the network, FaxJack 20 dials the local number of a Point of Presence, the SmartPOP 24. Once connected to the SmartPOP 24, the FaxJack 20 communicates setup information such as serial number of the FaxJack 20 and destination facsimile phone number. At this point, FaxJack 20 and SmartPOP 24 are in communication with each other and can communicate additional data if necessary. After the source SmartPOP 24 has verified that the FaxJack 20 is registered, it connects to a SmartPOP 26 that is servicing the destination facsimile phone number. The number being dialed is passed to the destination SmartPOP 26 and the destination number is dialed. After connecting and communicating initial facsimile machine setup parameters, the destination SmartPOP 26 notifies the source SmartPOP 24 that it has made a successful connection with the destination facsimile machine 11.

At this point, FaxJack 20 connects the transmit signal of the source facsimile 10 to the outside phone line and the facsimile machine 10 initiates a facsimile G3 session. The data from the source facsimile 10 is received as analog signals by the source SmartPOP 24 and then digitized (rasterized) and transmitted as packets to the destination SmartPOP 26. The digitized (rasterized) packets are received and recombined by the destination SmartPOP 26 and converted back to analog signals. These analog signals are then sent to the destination facsimile 11. Information communicated between the destination facsimile 11 and the source facsimile 10 is also communicated in the same manner.

The network can be either a frame relay network, an ATM network, or a SMDS protocol network.

In another embodiment of the system for transmitting facsimile data, where a computer is used to transmit a facsimile without using a facsimile machine, a functional equivalent of the FaxJack implemented in software may also be used instead of a hardware version of FaxJack 20.

In the system according to the invention, instead of the data being transmitted through voice grade lines, it is communicated using a packet switched digital network. The packet switch digital network may be a frame relay network, ATM network, a digital network using SMDS protocols, or another type of digital network, as is known to those of ordinary skill in the art. The data is transmitted digitally between the source SmartPOP 24 and the destination SmartPOP 26. This is accomplished by selectively redirecting the user's long distance calls before they are directed to their long distance carrier. To allow such selective redirection, the faxJack 20 according to the invention is provided between the facsimile machine 10 and the telephone jack 20.

Analog lines are still used to communicate from the source facsimile machine 10 to the source SmartPOP 24 and from the destination SmartPOP 26 and the destination facsimile machine 11. The reason for using digital communications between the two SmartPOP™'s is that this method is fundamentally more efficient in bandwidth allocation and usage and in the use of control resources, thereby producing a highly efficient, cost effective system.

To facilitate a full and complete understanding of the invention, the environment in which the apparatus and method for transmitting facsimile data according to how the present invention operates will now be reviewed with reference to FIGS. 3 to 6.

Figure 3:
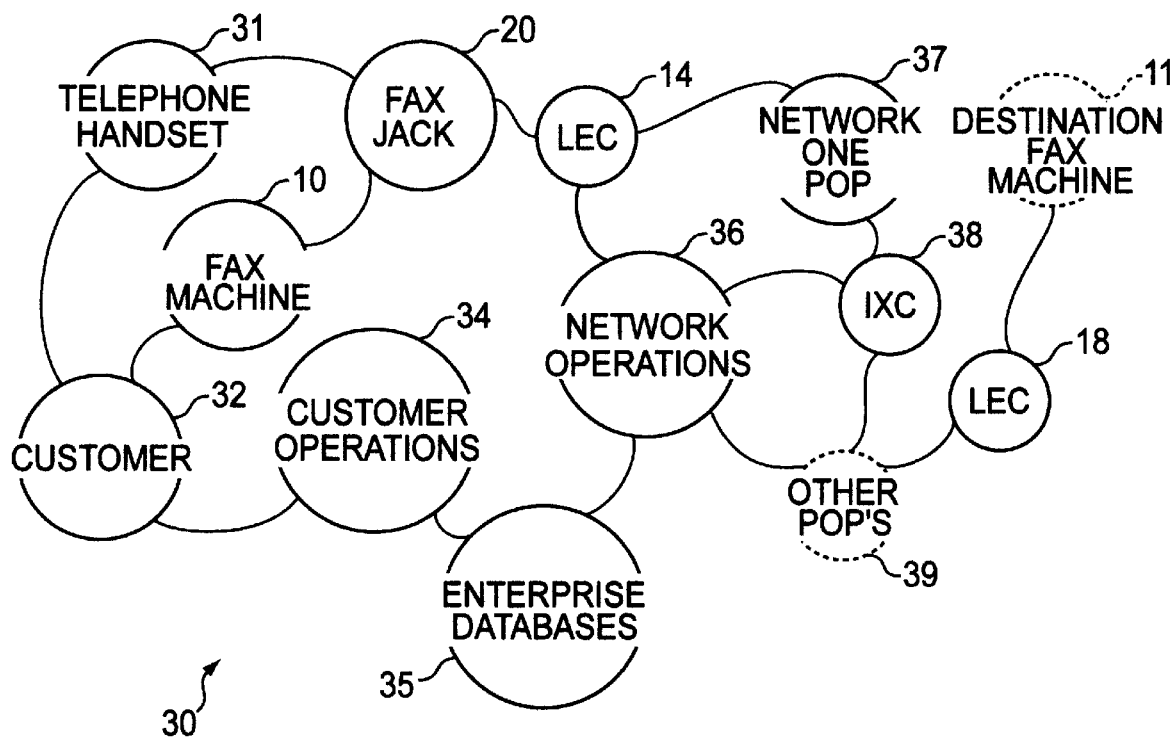
FIG. 3 is a block diagram showing the connectivity of the components of the facsimile network according to the invention.

Referring to FIG. 3, a customer 32 utilizes the network through the use of a facsimile machine 10. Before the customer 32 accesses the network, the customer contacts FaxJack Sales located in Customer Operations 34 to sign up for the service to acquire a FaxJack 20. Once customer 32 has been signed up and a FaxJack 20 has been inserted between the facsimile machine 10 and a telephone outlet, FaxJack 20 is initialized with the appropriate site and network information. The initialization is done through the use of a telephone handset 31 and can either be done by the sales person while installing the FaxJack 20 or by the customer with the help of customer support located within Customer Operations 34. Through the use of the telephone handset 31, FaxJack 20 is instructed to communicate with the FaxJack Setup component of Network Operations 36 for site specific initialization data.

Once FaxJack 20 is initialized, customer 32 utilizes the facsimile machine 10 as the customer did previously and FaxJack 20 takes care of routing calls through the network. When FaxJack 20 determines that a call can be directed through the network, it calls a Point of Presence, POP 37, and communicates information required to complete the call, such as the phone number of the destination facsimile machine 11. POP 37 is then responsible for setting up a path to the destination facsimile machine 11 and informing FaxJack 20 when to connect the source facsimile machine 10 to the POP 37. Customer Operations 34 also handles billing issues and other problems a customer may have.

Figure 4:
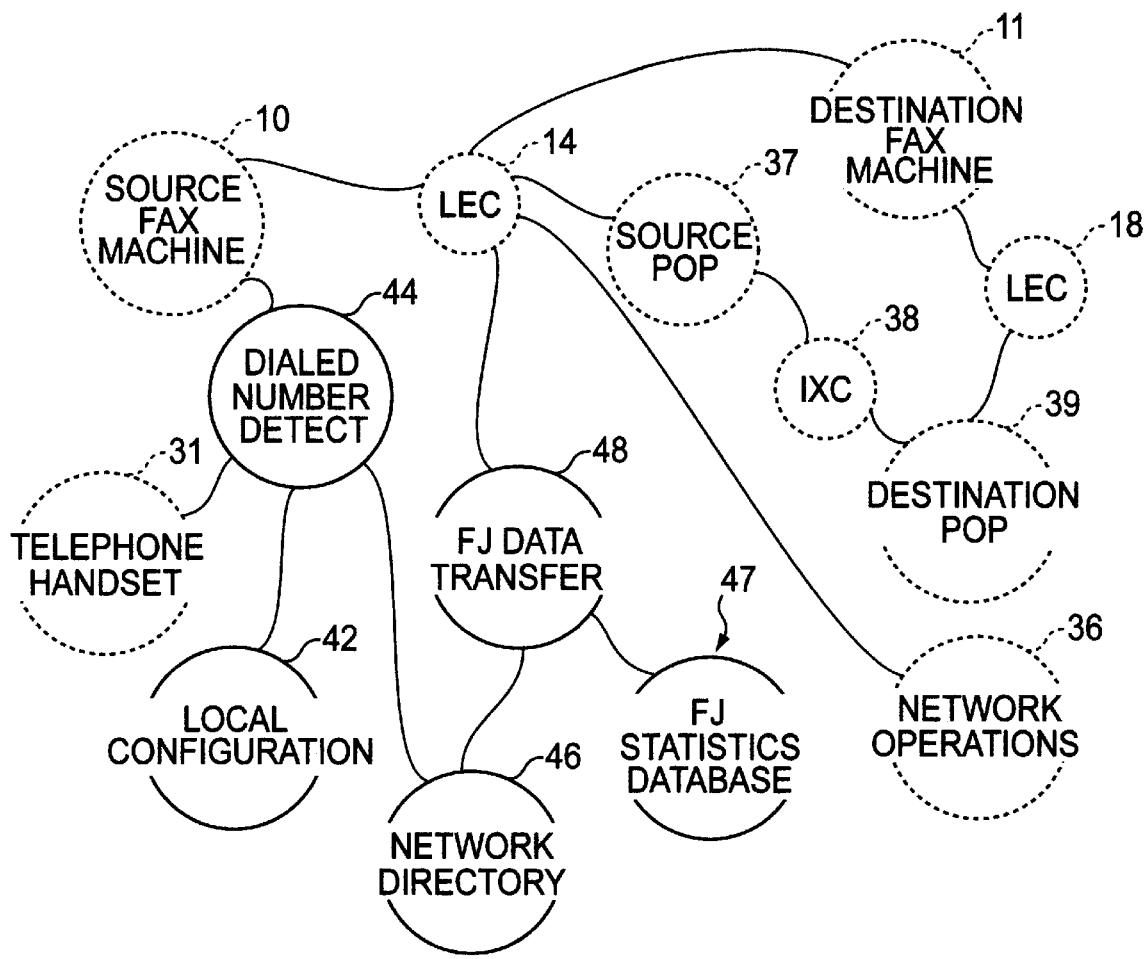
FIG. 4 is a block diagram showing the connectivity of the components of the FaxJack according to the invention.

Referring now to FIG. 4, the FaxJack is a piece of electronic hardware that is installed between a customer's facsimile machine and a telephone wall outlet. Details of the FaxJack are provided in the related applications "Facsimile Jack for selectively Routing a transmission through a facsimile network", Serial Number (Unassigned), Attorney Docket Number 75488/104; "Method of Routing a data transmission", Serial Number (Unassigned), Attorney docket Number 75488/103; and "Method of monitoring a data transmission", Serial Number (Unassigned), Attorney docket Number 75488/110, all of which are incorporated by reference herein. The FaxJack contains a microprocessor along with other electrical components and control software that allows it to make routing decisions and communicate with a POP, for normal operation, and Network Operations for initial setup. In FIG. 4, objects shown with dashed lines are not part of the FaxJack and are illustrated to show interactions. In FIG. 4, the source facsimile machine 10 is the machine that initiates the facsimile transmission and is connected to the FaxJack. The destination facsimile machine 11 is the machine that is to receive the facsimile transmission. The source POP 37 is located in the local calling area of the source facsimile machine 10 and is accessed through the LEC 14. The destination POP 39 is located in the local calling area of the destination facsimile machine 11 and accesses the destination facsimile through LEC 18.

The LEC may be replaced by a) a wireless carrier (cellular, PCDS, or fixed frequency), b) alternative LECS, also known as Competitive LECS (CLECs), or c) a direct connection via private or leased line service, situated between the customer's facility and the POP.

In operation, the source facsimile machine 10 begins its initial communications by dialing a number which is intercepted by the FaxJack. Once the FaxJack has the dialed number, it determines if the call is to be routed through the network or not by looking up the area code and exchange in the Network Directory 46. If the number is not serviced by the network, then the FaxJack routes the call through the LEC 14 directly to the destination facsimile machine 11. If the number is serviced by the network, the FaxJack calls the local POP 37 and passes on the phone number of the destination facsimile machine 11. When instructed by the POP 37, the FaxJack connects the source facsimile machine 10 directly to the POP 37 to commence facsimile communications. Certain sequences of digits that are dialed place the FaxJack into a local control mode. These special digits are generated by attaching a telephone handset 31 to the FaxJack instead of the facsimile machine 10. Once the FaxJack detects the appropriate sequence of digits, it enters local control mode. Once in local control mode, commands can be sent, via digits being dialed, to the FaxJack that cause it to update parameters in FaxJack's local configuration during the initial FaxJack setup. While in local control mode, the FaxJack can also be instructed to communicate with Network Operations 36 to download the most recent version of FaxJack control code, the latest version of the network directory corresponding to the FaxJack's local calling area, and authentication parameters that make it a valid use of the network. This is normally only done during initial setup.

The Dialed Number Detect 44 component of the FaxJack decodes the tones being dialed by the facsimile machine 10 or the attached handset 31. Basically, the Dual Tone MultiFrequency tones used in tone dialing are converted to the actual digits dialed. The FaxJack does not operate with a rotary dial phone. Once the Dialed Number Detect 44 converts the dialing sequence of numbers, it can then be acted on by the FaxJack software. Local Configuration 42 is data pertaining to the local FaxJack installation. This is information such as the customers account numbers, FaxJack serial number, whether or not the FaxJack resides in a PBX or not, the number of the local POP, as well as other customer and site specific information. The Network Directory 46 contains a database of the area codes and corresponding exchanges that are serviced by the network. When a customer instructs the source facsimile machine 10 to dial a destination facsimile phone number 11, the FaxJack determines if the number is serviced by the network by looking up the area code and exchange in the Network Directory 46. The Network Directory 46 is updated periodically by the POP 37 when communications take place between the FaxJack and the POP 37 at the front end of a facsimile transmission.

During normal operation, the FaxJack keeps statistics on outgoing and incoming facsimile. This data includes the number of pages transmitted and received, number of local call, duration of calls, etc. This data is uploaded to the local POP when requested.

FaxJack Data Transfer 48 is responsible for communications between the FaxJack and the local POP 37. When instructed, the FaxJack either uploads statistical data to the POP 37 or downloads updated Network Directory 46 information from the POP 37.

The FaxJack has the following features:
(a) The device utilizes power from the customer's site through the use of a UL approved wall adapter supplying no more than 1 watt.
(b) If the device fails or loses power, the customer's equipment continues to operate as if the device was not installed.
(c) Installation of this device is transparent to incoming facsimile traffic.

FaxJack supports three methods of routing a subscriber's outgoing facsimile traffic; on-net, by using a system for transporting over a switched voice network or POTS, and off-net (presubscribed carrier). The FaxJack routes traffic according to the dialed digits that define the intended destination number. The FaxJack employs two filters: an off-net filter and an on-net filter. All on-net traffic is directed to a POP. All off-net traffic is directed to the presubscribed carrier. All other traffic is directed to the system for transporting over a switched voice network or to the presubscribed carrier. The on-net filter typically identifies traffic to destinations that are covered by the network. The off-net filter identifies destinations that are temporarily forced off-net (out of service numbers) or permanently off-net (reserved area codes: 911, 411, etc.).

Calls are not placed through the network if it has been previously determined that the destination phone number is out of service. Under this condition the calls are placed through the customers long distance carrier until an in-service condition is detected at the destination number. Future calls to the number are routed through the network. The FaxJack supports this type of routing for a programmable amount of not-in-service numbers at once.

If a call has been placed through the network and it has been determined that the destination phone number is busy, the call is not be routed through the network while there is some probability that the number will still be busy. The exact probability threshold to be used (e.g. 50%) is programmable and will be varied based on customer and network usage statistics. Customers that generate higher revenue are given higher priority access to the network during peak operating times. In the event that a call is not able to be connected through the network because of network congestion, the call is targeted to be rerouted within the same initial facsimile session 95% of the time. Calls that cannot be rerouted within the initial facsimile session are signaled as busy to the attached facsimile machine.

Figure 5A:
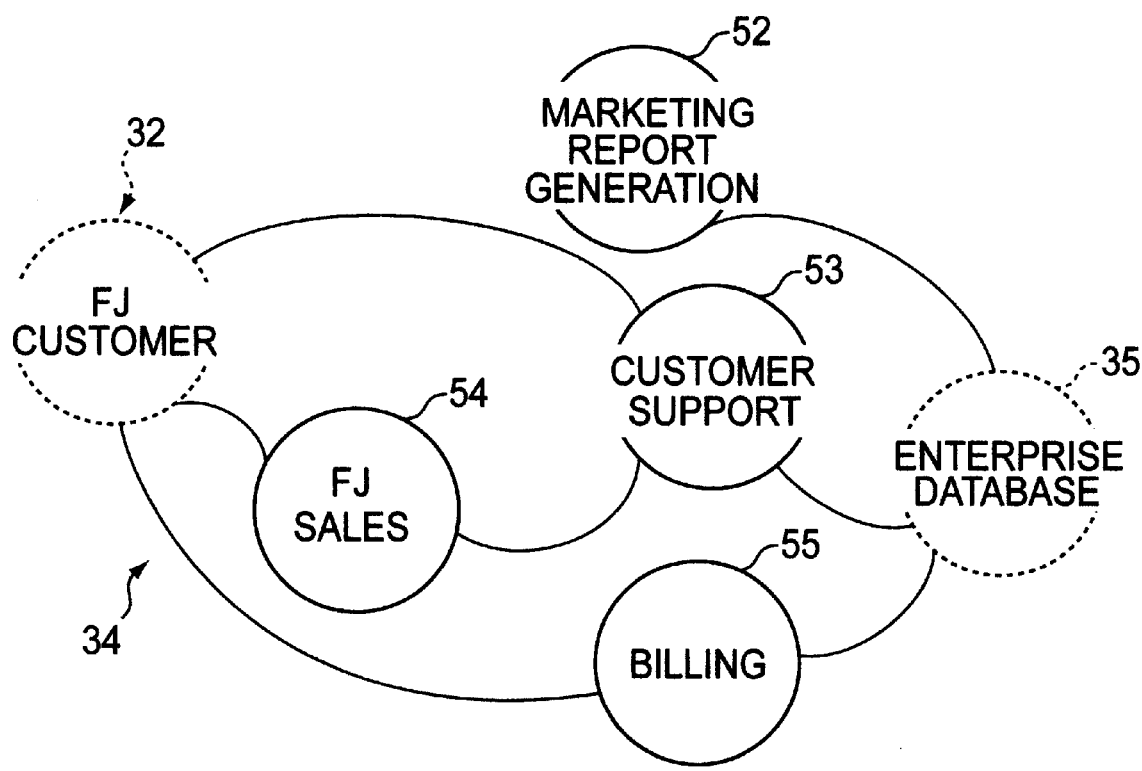
FIG. 5(*a*) is a block diagram showing the connectivity of the components of the customer operations according to the invention.

The FaxJack gathers the following statistical data:
minimum, maximum, and average time required to connect to network
minimum, maximum, and average call duration for network facsimile transmissions
minimum, maximum, and average call duration for local facsimile transmissions
minimum, maximum, and average call duration for long distance, non-network facsimile transmissions
total number of domestic facsimile transmissions
total number of international facsimile transmissions
total number of network facsimile transmissions
number of long distance, non-network facsimile transmission
total number of local facsimile transmissions
total number of answered outgoing facsimile transmissions
total number of non-answered outgoing facsimile transmissions
total number of incoming facsimile transmissions
total number of outgoing facsimile transmissions
call distribution vs. time of day for incoming facsimile transmissions
call distribution vs. time of day for outgoing facsimile transmissions Referring now to FIG. 5(a), Customer Operations 34 is provided for handling the interactions that take place with customers, such as initial sign-up, billing 55, customer support 53 and FaxJack sales 54. Customer Operations 34 also provides customers a report that is generated from the data collected about the network and users of the network. In FIG. 5(a), components shown as dashed lines are not part of Customer Operations but show interactions with other system elements.

FaxJack Sales 54 contacts the customers and distributes the FaxJack devices. FaxJack Sales 54 also performs local initialization of the FaxJack at the customers discretion.

Once a customer has a FaxJack, the customer contacts Customer Support (CS) 53 to sign up for the service. Information such as customers' name and billing address are collected during the initial call. Once a customer has signed up for the service and has been sent a FaxJack, CS 53 instructs the customer or FaxJack Sales 54 on how to perform local initialization of the FaxJack. Network initialization, the actual downloading of additional data required to operate with the network is done through Network Operations as they manage the necessary physical resources to deliver data pertaining to the configuration of the network. The customer or FaxJack Sales 54 is instructed by Customer Support 53 on how to perform network initialization.

Customers also contact Customer Operations when they have technical questions about the network or require assistance in diagnosing problems with the FaxJack or the network. The FaxJack has several diagnostic LED's that indicate the status of the FaxJack. If a customer notes a problem with the FaxJack, they are instructed to call Customer operations.

Once a customer has been signed up and given a customer ID, CS 53 places customer specific information such as customers ID, account number, name, location, and various other setup information in the Enterprise Database 35. Network Operations then accesses this customer information and validates the user prior to downloading network setup information.

Customer Operations is responsible for issuing bills to customers for network usage. All data pertaining to billing is stored in the Enterprise Database 35 by the appropriate system elements. The Billing process accesses this data in order to generate bills. Customers contact Customer Support 53 for questions pertaining to billing.

All data pertaining to customers that have signed up for network service as well as their network usage data is stored in a central database known as the Enterprise Database 35. Other components of the network such as Network Operations, Billing and Marketing Report Generation access various components of the data to perform their tasks. The enterprise database 35 is the means by which most data is communicated between the system elements.

Figure 5B:
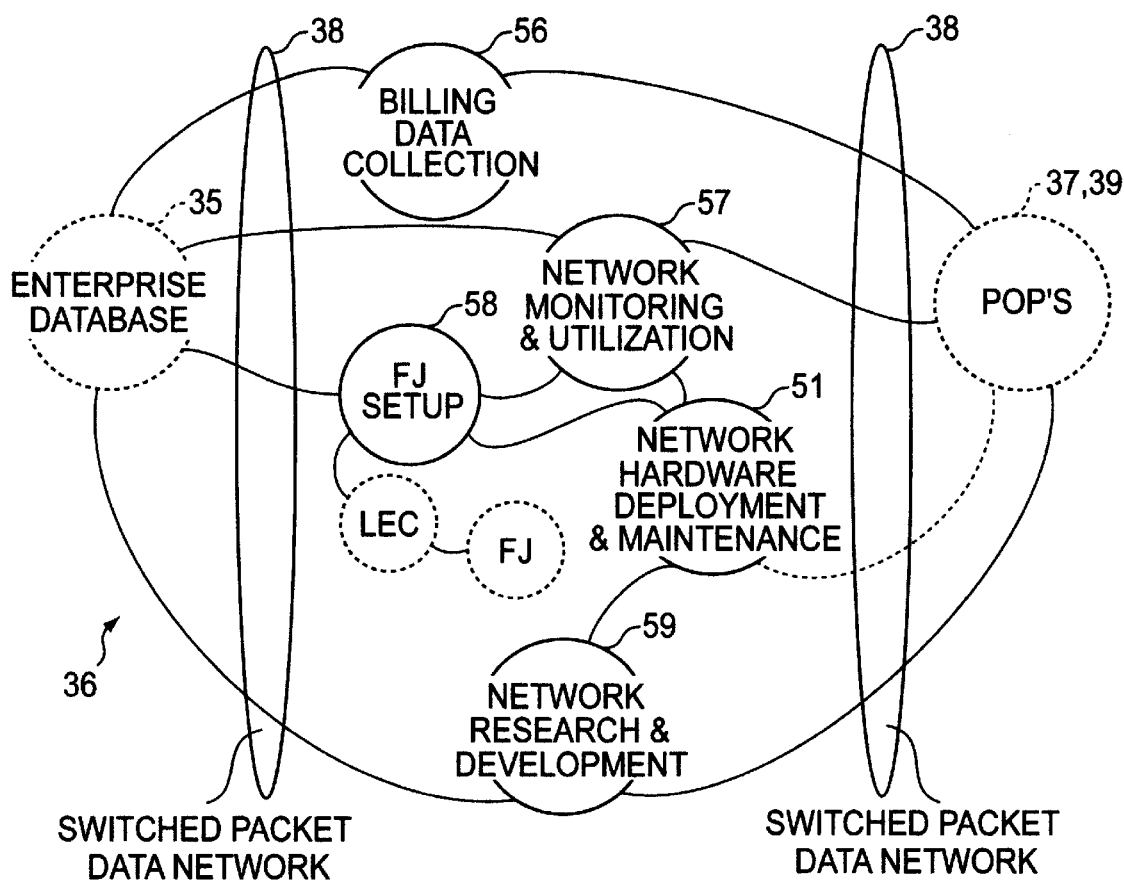

The Enterprise Database 35 does not just store billing data but also stores data about network utilization that is gathered by Network Operations through Network Monitoring and Maintenance (FIG. 5(b). The database contains network topology and software configuration information.

Access to the Enterprise Database 35 is carefully controlled as it contains sensitive information. An access mechanism with carefully controlled privileges is part of the Enterprise Database 35.

In addition to the customers that access the network through the use of a FaxJack, reports are provided to additional customers interested in the customer and statistical data that is gathered over the network and stored in the Enterprise Database 35. The Marketing Report generation 52 interfaces with the customers of these reports as well as generates the reports. The generation of reports is seen as an added benefit of the fact that most of the data stored in the Enterprise Database 35 is needed for planning future growth of the network, maintaining the network, and billing customers of the network.

Referring now to FIG. 5(b), Network Operations 36 brings up and maintains the network by monitoring devices in the POPs for proper functionality and the network for security violations. Network Operations 36 monitors all aspects of the network and records statistics of network utilization. In FIG. 5(b), components shown as dashed are not part of Network Operations 36 but show interactions with other elements.

Network Operations 36 does the majority of its communications through the network via the interexchange carrier's data networking service (IXC) 38. One of the exceptions to this is that a FaxJack calls into Network Operations 36, via a 800 phone number, for example, to get initialized.

Network Monitoring and Utilization 57 monitors network traffic and physical network devices, such as POPs 37, 39, to determine hardware failures or unusual conditions. It utilizes such practices as periodic communications with the POPs 37, 39 to insure that they are operating correctly. Another typical test is to monitor communications traffic on the network segments to detect abnormal conditions. Network Monitoring and Utilization 57 does not actually act on the information that it accumulates. Rather, it just watches network devices to see that they are working correctly. Network Monitoring and Utilization 57 attempts to isolate the source of the problem. If Network Monitoring and Utilization 57 detects a problem with a particular net segment or a POP 37 or 39, it notifies Network Maintenance 51, which corrects the problem.

Network Monitoring and Utilization 57 also gathers statistical data about message traffic to and from the POPs 37, 39. This statistical data is stored in the Enterprise Database 35 and can later be accessed by various network components so that network can be sized and modified to best support the network traffic. This data is also used to generate reports by the Marketing Report Generation 52 located in Customer Operations 34 for sale to outside customers.

Network Monitoring and Utilization 57 also serves as an early warning system for network intruders or other uncharacteristic network behavior by performing such tests as monitoring network packets and insuring that they are being sent by valid users of the network. If an intrusion is detected, Network Monitoring and Utilization 57 informs Network Maintenance 51 of the violation.

Network Research and Development 59 performs Network Configuration, POP Software Configuration, and FaxJack Software Configuration. Network Research and Development 59 researches the needs of the network and plans the roll-out of future POPs, new equipment, equipment upgrades, POP software updates, FaxJack software updates, and reconfigures the network to optimize traffic flow and return on investment. Network Configuration maintains routing software configuration as well as vendor specific software updates for network hardware. POP Software Configuration plans and provides new versions of any software contained within the POPs and insures that roll-outs do not compromise the integrity of the network. A typical example of this is to guarantee that a partial roll out of software to the network does not prevent POPs from talking to other POPs, or network monitoring elements from communicating with the POPS. FaxJack Software Configuration provides new versions of the FaxJack control software to the POPs so that the POPs can download the new software to the FaxJack.

Network Hardware Deployment & Maintenance 51 deploys and maintains the physical components of the network. It does not install or maintain the software for the network components. Software updates are done and maintained through the network itself.

When the hardware components of the network are initially deployed in a POP, there is a minimal amount of software that is installed with it. This software allow the POP to communicate through the network to Network Operations 36 so that POP software can be downloaded to bring the POP up to full operation.

Billing Data Collection 56 gathers the billing data from the Billing Pipes in the POPs 37, 39 and stores it into the Enterprise Database 35. The billing pipes, located within the POPs 37, 39, are passive elements of the system and hence the billing data collection process empties the data from the pipes. System elements with the appropriate access rights, such as Billing 55 in Customer Operations 34, then accesses the data to complete their tasks.

Billing Data Collection 56 is synchronized with Billing 55 located in Customer Operations 34. When Billing 55 is ready to begin the billing process, the most up to date data is available to insure customers are billed appropriately. Billing is an ongoing daily activity with certain segments of customers receiving their bills on certain days of the month. This means that the gathering of the data for these customers has to be closely coordinated with the billing process cycle.

The FaxJack Setup 58 in Network Operations 36 interacts with FaxJacks that call into Network Operations 36 to be downloaded with appropriate initialization data to become a valid user of the network. The FaxJack is authenticated with data stored in the Enterprise Database 35 located in Customer Operations 34. The FaxJack Setup 58 process also interacts with Network Monitoring and Utilization 57 as the setup process requires network elements that are to be managed.

FaxJack Setup 58 interacts with FaxJacks that call in and need to be initialized by downloading the latest FaxJack software and the latest appropriate Network directory for the calling area that is serviced by that FaxJack. FaxJack Setup 58 interacts with the Enterprise Database 35 to insure that the calling FaxJack is authorized to use the system and what versions of software need to be downloaded.

Figure 6:
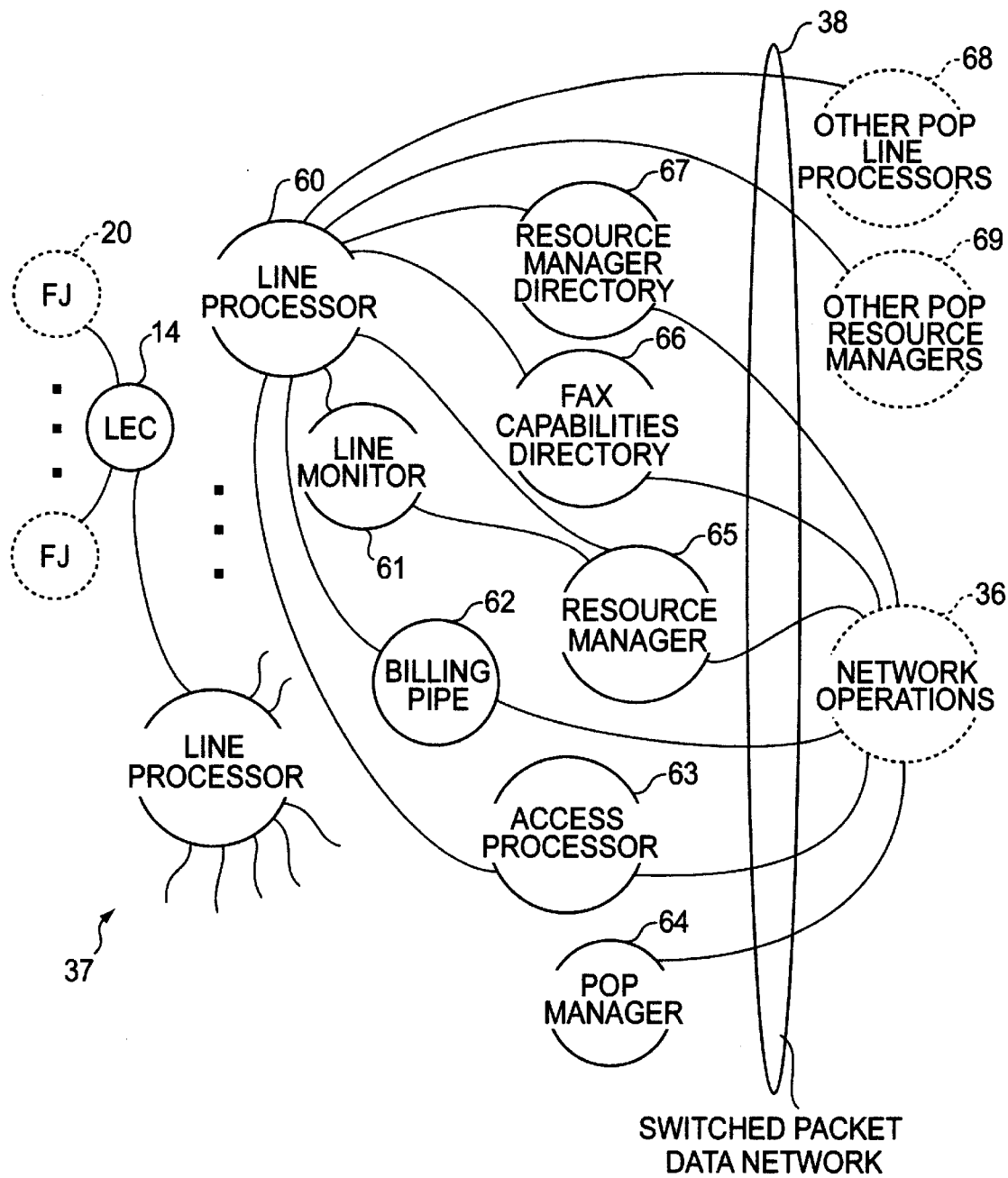
FIG. 6 is a block diagram showing the connectivity of the components of the POP according to the invention.
Figure 7A:
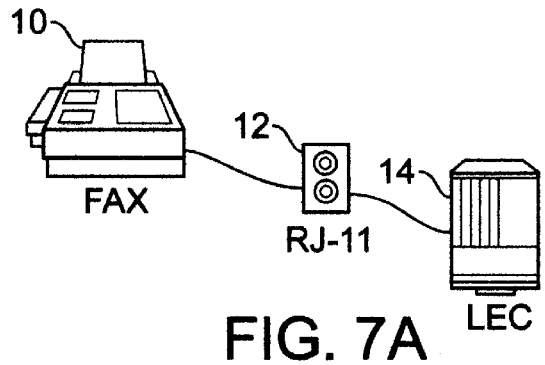
FIGS. 7(*a*)–7(*e*) show various equipment configurations according to the present invention.
Figure 7B:
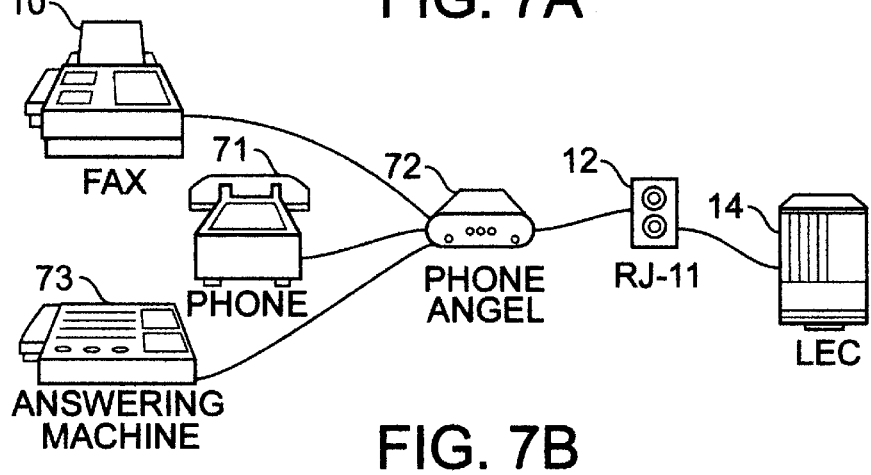
Figure 7C:
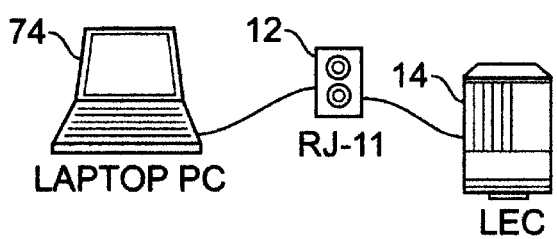
Figure 7D:
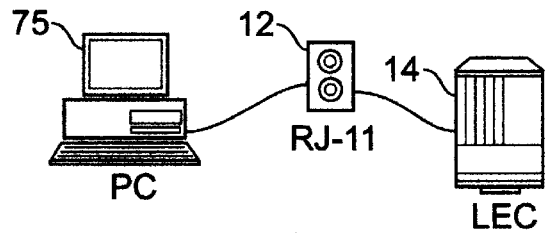
Figure 7E:
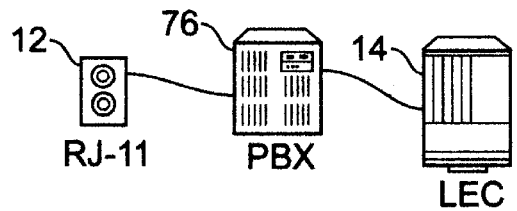

Referring to FIG. 6, the Point of Presence, POP 37, is the SmartPOP™ where equipment that supports the network is located. Details of the SmartPOP™ are provided in the related applications "Point-of-Presence (POP) for digital facsimile network", Serial Number (Unassigned), Attorney Docket Number 75488/102"; "Point-of-Presence (POP) for digital facsimile network with Virtual POPs used to communicate with other networks", Serial Number (Unassigned), Attorney Docket Number 75488/109; and "Point-of-Presence (POP) for digital facsimile network with Spoofing capability to maintain fax session", Serial Number (Unassigned), Attorney Docket Number 75488/108, all of which are incorporated by reference herein. POP's are distributed throughout the United States along with the equipment for the Local Exchange Carrier, LEC 14. POPs are connected to each other via Permanent Virtual Circuits, PVCS, which are physical communications channels that are dedicated to the network for systems communications.

The Line Processor, LP 60, fields incoming calls from the LEC 14 and runs an access state machine which verifies the authenticity of a FaxJack 20 making the incoming call. Once verified, the LP 60 accesses the Resource Manager Directory 67 to determine the location of the POP that services the calling area of the destination facsimile machine. Once it has the address, LP 60 contacts the resource manager RM 65, via the IXC 38, of the destination POP to determine if there is an available LP to route the call through. If there is, the LP 60 conducts the facsimile session protocol to complete the facsimile transmission and end the facsimile session. After completion of the transmission, LP 60 generates a complete record of the transaction and stores it into the Billing Pipe, BP 62. The LP 60 also performs any scheduled statistical or configuration data transfers with the FaxJack 20.

The Line Monitor, LM 61, keeps the RM 65 informed of the availability of line processors. In a POP, there are many LP's 60 communicating with a single LM 61 which in turn communicates with the RM 65.

RM 65 maintains a record of the state of all LPs 60 in one POP. LPs 60 inform the RM 65 when they field an incoming call from the LEC 14. When a RM 65 gets a request from a remote RM 65 requesting a LP 60 in the local POP, the RM 65 commands a local LP 60 to seize a local line in order to place outgoing calls. If a local LP 60 responds, then the RM 65 notifies a remote LP that it has successfully seized a line to attempt the facsimile transmission. If a RM 65 is unable to acquire a local LP, then it signals failure to the remote RM.

The Resource Manager Directory 67 contains a local database which converts long distance telephone numbers into network addresses of RMs that can choose line processors that service the local area indicated by the destination phone number. The Resource Manager Directory 67 is updated through the IXC 38 by Network Operations 36.

The Facsimile Capabilities Directory, FCD 66, contains characteristics of local facsimile machines that have communicated through the POP. This is used to generate statistics about the activities carried on through the POP as well as to determine the characteristics of a particular facsimile machine in the event that spoofing is required. For local facsimile machines that have FaxJacks, the database also contains scheduled updates and statistical data which is transferred between the FaxJack and the local facsimile database by the line processor at the beginning of a call.

The Billing Pipe, BP 62, stores billing data from each of the facsimile sessions and contains data pertaining to customer billing. The BP 62 carries statistical data to the extent that statistics can be derived from the billing data.

The BP 62 maintains billing data integrity during system failures and accumulates billing data for extended periods of time in the event the BP 62 can not be emptied by Network Operations 36.

The Access Processor, AP 63, handles the FaxJack specific portion of a communications session between the FaxJack and the POP. There are two separate functions carried out by AP 63. The first is to verify the authenticity of a FaxJack that is attempting to utilize the network. The second is to perform data exchanges with the FaxJack. The data exchanges include things like downloading new versions of the network directory and new versions of control code to retrieve statistical data that the FaxJack has accumulated.

The POP Manager, MGR 64, brings up the POP as well as gathers network management data for communications with Network Operations 36. Each of the POP elements have provisions for communicating data to the POP Manager 64.

Communications from the FaxJacks into the POP are done through the LEC 14. Communications to the other POPs 68, 69 and network operations 36 are done through the IXC 38.

According to the present invention, as shown in FIGS. 7(a) to 7(e), the following configurations are supported:

(a) A facsimile machine 10 directly connected to a RJ-11 connector 12 that communicates directly with the LEC 14. See FIG. 7(a).

(b) A facsimile machine 10 along with a phone 71 and an answering machine 73 connected to a line sharing device, commonly referred to as a "phone angel" 72. The "phone angel" 72 is then connected to a RJ-11 connector 12 which communicates directly to the LEC 14. See FIG. 7(b).

(c) A lap top computer with a facsimile modem 74 connected to a RJ-11 phone outlet 12. See FIG. 7(c).

(d) A PC with a facsimile modem 75 connected to a RJ-11 phone outlet 12 which communicates to the LEC 14. See FIG. 7(d).

(e) A PBX 76 between the RJ-11 phone jack 12 and the LEC 14 where the PBX 76 supplies a 2-wire tone-dialed local loop. See FIG. 7(e).

With the present invention, the following advantages are obtained:

(a) The present network carries real-time facsimile transmissions more economically than the existing voice network.

(b) The present network does not require the users to change the procedures and/or equipment they currently use to transmit a facsimile today.

(c) The present system supports the basic Group 3 facsimile which includes T.4 one-dimensional (MH) encoding, T.30 300 bps negotiation, and V.17/V.29/V.27 modulations.

(d) The present system implements a filtering function in the FaxJack that allows carriable traffic on-net. The filter is reprogrammable to reflect changes in network coverage over time.

(e) The present system uses the capacity of the FaxJack device to observe all of a customer's facsimile traffic to gather information regarding the telecommunications usage patterns of the installed base.

(f) The present system uses a secure access method that reduces the impact of fraudulent access to a level that is of no economic consequence.

(g) The present system uses a scalable transmission plant based on uniform arrangements of commodity equipment, whose capabilities are software-defined.

(h) The present system uses a quality of service comparable to or better than the existing voice carrier network.

(i) The present system uses a proactive, standards-based network management.

(j) When sending a facsimile the subscriber achieves the same results as for the POTS network. When a subscriber finishes sending a facsimile, the destination facsimile machine actually receives the facsimile. The system does not require the user to change the hardware currently used to send facsimile transmissions. A user is not required to change the facsimile machine currently being used. A restriction to this is that the customer access line and facsimile machine support tone dialing.

While this invention has been described in detail and with reference to the preferred embodiment thereof, it will be apparent to one skilled in the art that various changes and modifications can be made therein without departing from the spirit and scope thereof. The present invention is only limited by the claims appended hereto.

We claim:

1. A facsimile system for transmitting data in real-time over a standard digital data network, or an analog network, wherein the facsimile data is sent in data packets on the digital data network, said facsimile system comprising:

first means for monitoring a number in an area being dialed by a facsimile device, and determining whether said number is one of a local number, an intra-lata number, an inter-lata number and a long distance number, and for determining whether the area is being serviced by the digital data network; and second means for receiving facsimile data from said first means, said second means being an interface by which a user gains access to the digital data network, wherein said second means includes processors connected via Local Area Networks (LANs) to control communication between facsimile modems, wherein said second means includes a first POP (point-of presence) and a second POP, and wherein said first means is connected between the facsimile device and a phone jack, and wherein when a destination facsimile number is dialed, the first means reads in the number and determines if the number can be accessed by said second means, and if the destination facsimile number cannot be accessed by said second means, the facsimile transmission is sent over the analog network using a standard G3 protocol, and if the destination facsimile number can be accessed by the second means, the first means sends the facsimile data to the first POP which is accessed via a local telephone call over a standard telephone line.

2. A facsimile system, as recited in claim 1, wherein the first POP receives the facsimile transmission, converts the facsimile transmission to a rasterized form, and then converts the rasterized data into packets of data, which are sent over the digital data network, one packet at a time, to the second POP.

3. A facsimile system, as recited in claim 2, wherein the second POP receives the packets addressed to said second POP over the digital data network, converts the packets to the rasterized form, and then reconverts the rasterized data using the standard G3 protocol, to be sent via a second local telephone call over a second standard telephone line to the destination facsimile.

4. A facsimile system, as recited in claim 1, wherein the digital data network is one of a frame relay network, an ATM network, or a SMDS protocol network.

5. A facsimile system, as recited in claim 1, wherein the digital data network is an asynchronous transfer mode network.

6. A method for transmitting data in real-time over a digital data network, or an analog network, wherein the facsimile data is sent as data packets on the digital data network, said method comprising the steps of:

a) monitoring a number in an area being dialed by a facsimile device;

b) determining whether the number is a long distance number and whether the area is being serviced by the digital data network; and c) receiving facsimile data in an interface by which a user gains access to the digital data network, said interface including a first POP (point-of presence) and a second POP, wherein said first POP sends said data packets to said second POP over the digital data network, wherein in step (b), when a destination facsimile number is dialed, the number is read to determine if the number can be accessed, and if the destination facsimile number cannot be accessed, the facsimile transmission is sent over the analog network using a G3 protocol, and if the destination facsimile number can be accessed, then the facsimile data is sent to the first POP which is accessed via a local telephone call over a standard telephone line.

7. A method for transmitting data, as recited in claim 6, wherein in step (c), the first POP receives the facsimile transmission, converts the facsimile transmission to a rasterized form, and then converts the rasterized data into the data packets, which are sent over the digital data network, one packet at a time, to the second POP.

8. A method for transmitting data, as recited in claim 7, wherein in step (c), the second POP receives the data packets addressed to said second POP over the digital data network, converts the packets to the rasterized form, and then reconverts the rasterized data using the standard G3 protocol, to be sent to the destination facsimile via a second local telephone call over a second standard telephone line.

9. A method for transmitting data, as recited in claim 6, wherein the digital data network is one of a frame relay network, an asynchronous transfer mode (ATM) network, and a SMDS protocol network.

10. A method for transmitting data, as recited in claim 6, wherein the digital data network is an asynchronous transfer mode network.

11. A method for transmitting data, as recited in claim 8, wherein the facsimile transmission includes at least first and second packets of data, and wherein said first packet is received by the first POP simultaneously with said second packet of data being received by said second POP.

12. A facsimile system for transmitting data in real-time over a standard digital data network, or an analog network, wherein the facsimile data is sent in data packets on the digital data network, said facsimile system comprising:

a monitoring and determining unit for monitoring a number in an area being dialed by a facsimile device, and determining whether said number is one of a local number, an intra-lata number, an inter-lata number and a long distance number, and for determining whether the area is being serviced by the digital data network; and a receiving and processing unit for receiving facsimile data from said first means, said receiving and processing unit being an interface by which a user gains access to the digital data network, wherein said receiving and processing unit includes processors connected via Local Area Networks (LANs) to control communication between facsimile modems, wherein said receiving and processing unit includes a first POP (point-of presence) and a second POP, and wherein said monitoring and determining unit is connected between the facsimile device and a phone jack, and wherein when a destination facsimile number is dialed, said monitoring and determining unit reads in the number and determines if the number can be accessed by said receiving and processing unit, and if the destination facsimile number cannot be accessed by said receiving and processing unit, the facsimile transmission is sent over the analog network using a standard G3 protocol, and if the destination facsimile number can be accessed by said receiving and processing unit, said monitoring and determining unit sends the facsimile data to the first POP which is accessed via a local telephone call over a standard telephone line.

13. A facsimile system, as recited in claim 12, wherein the first POP receives the facsimile transmission, converts the facsimile transmission to a rasterized form, and then converts the rasterized data into packets of data, which are sent over the digital data network, one packet at a time, to the second POP.

14. A facsimile system, as recited in claim 13, wherein the second POP receives the packets addressed to said second POP over the digital data network, converts the packets to the rasterized form, and then reconverts the rasterized data using the standard G3 protocol, to be sent via a second local telephone call over a second standard telephone line to the destination facsimile.

15. A facsimile system for transmitting data in real-time over a standard digital data network, or an analog network, wherein the facsimile data is sent in data packets on the digital data network, said facsimile system comprising:

a monitoring and determining unit for monitoring a number in an area being dialed by a facsimile device, and determining whether said number is one of a local number and a long distance number, and for determining whether the area is being serviced by the digital data network; and a receiving and processing unit for receiving facsimile data from said first means, said receiving and processing unit being an interface by which a user gains access to the digital data network, wherein said receiving and processing unit includes processors connected via Local Area Networks (LANs) to control communication between facsimile modems, wherein said receiving and processing unit includes a first POP (point-of presence) and a second POP, and wherein said monitoring and determining unit is connected between the facsimile device and a phone jack, and wherein when a destination facsimile number is dialed, said monitoring and determining unit reads in the number and determines if the number can be accessed by said receiving and processing unit, and if the destination facsimile number cannot be accessed by said receiving and processing unit, the facsimile transmission is sent over the analog network using a standard G3 protocol, and if the destination facsimile number can be accessed by said receiving and processing unit, said monitoring and determining unit sends the facsimile data to the first POP which is accessed via a local telephone call over a standard telephone line.

16. A facsimile system, as recited in claim 15, wherein the first POP receives the facsimile transmission, converts the facsimile transmission to a rasterized form, and then converts the rasterized data into packets of data, which are sent over the digital data network, one packet at a time, to the second POP.

17. A facsimile system, as recited in claim 16, wherein the second POP receives the packets addressed to said second POP over the digital data network, converts the packets to the rasterized form, and then reconverts the rasterized data using the standard G3 protocol, to be sent via a second local telephone call over a second standard telephone line to the destination facsimile.

* * * * *